United States Patent [19]

Boersma

[11] 4,131,173

[45] Dec. 26, 1978

[54] INSTRUMENT PANEL COVER FOR VANDALISM PROTECTION

[75] Inventor: Richard F. Boersma, Springfield, Ill.

[73] Assignee: Fiat-Allis Construction Machinery, Inc., Deerfield, Ill.

[21] Appl. No.: 844,646

[22] Filed: Oct. 25, 1977

[51] Int. Cl.² .............................................. B60K 35/00
[52] U.S. Cl. .................................... 180/90; 70/160; 312/242
[58] Field of Search ................... 180/90, 114; 70/159, 70/160; 312/21, 22, 291, 242; 108/65, 81; 296/70

[56] References Cited

U.S. PATENT DOCUMENTS

| 3,583,519 | 6/1971 | Meyer et al. | 180/90 |
| 3,780,822 | 12/1973 | Frey | 180/90 |
| 3,814,205 | 6/1974 | Miller | 180/90 |
| 3,841,431 | 10/1974 | Russey | 180/90 |
| 3,913,701 | 10/1975 | Williams | 296/70 |

Primary Examiner—Kenneth H. Betts
Attorney, Agent, or Firm—August E. Roehrig, Jr.; Robert A. Brown; Harvey W. Rockwell

[57] ABSTRACT

An instrument panel cover pivotally connected to the vehicle dashboard and adapted to be folded upon itself into a position above the dashboard to minimize the storage space required by the panel cover when not in use and to eliminate obstructions in the operator compartment or the operator's field of vision.

10 Claims, 4 Drawing Figures

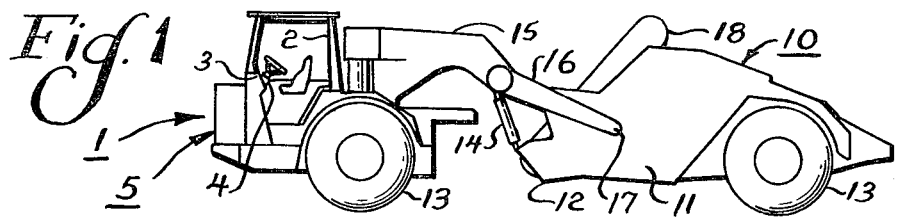
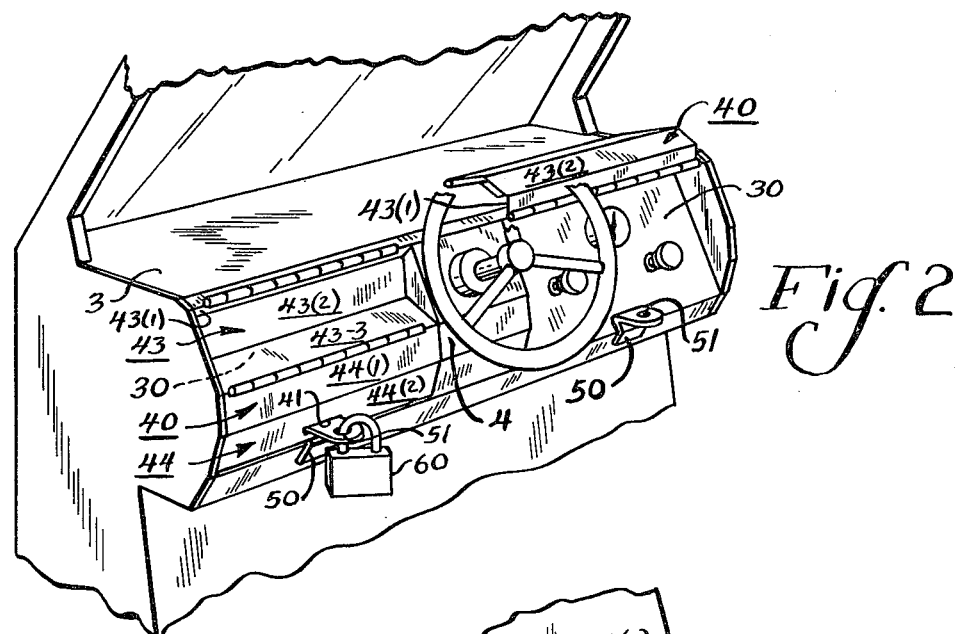
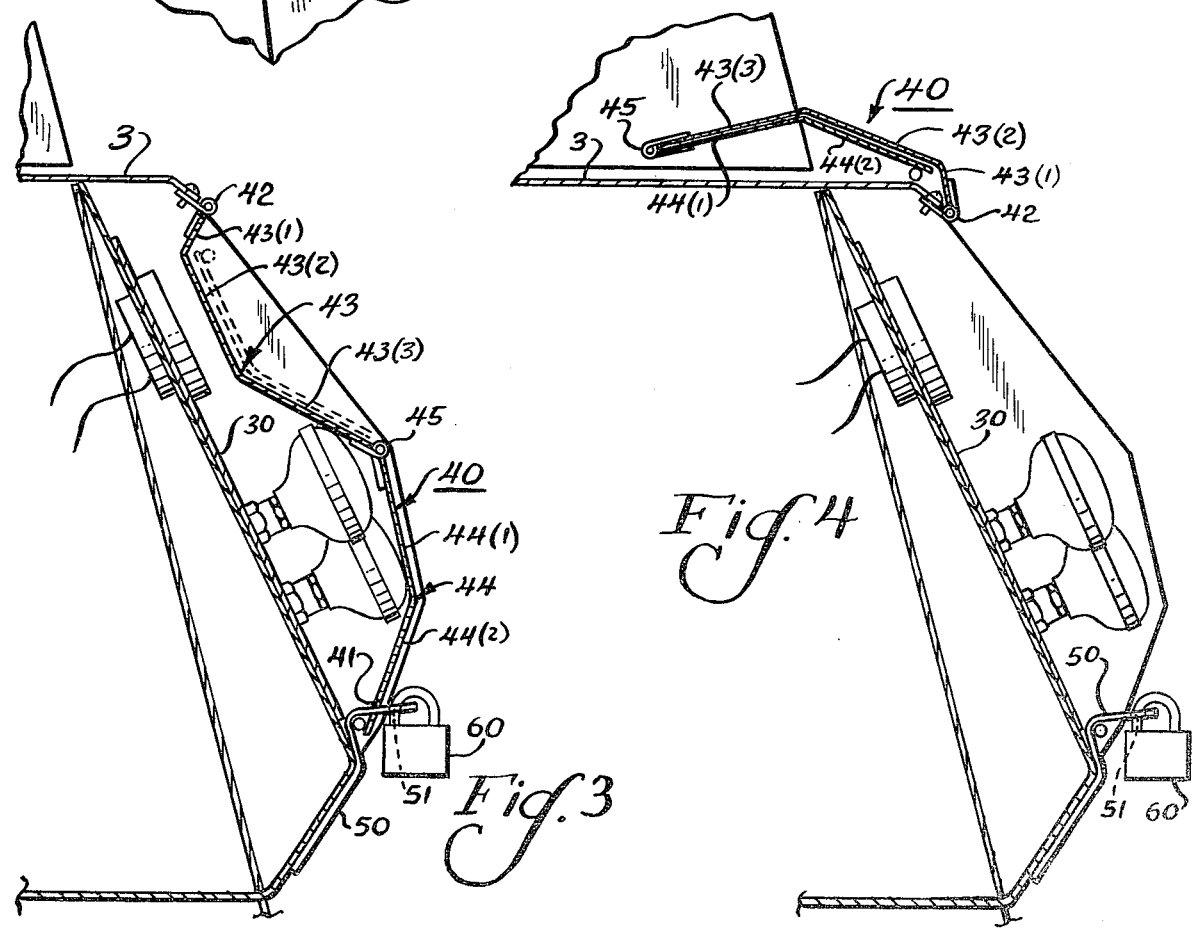

INSTRUMENT PANEL COVER FOR VANDALISM PROTECTION

BACKGROUND OF THE INVENTION

This invention relates in general to instrument panel covers and, in particular, to a self-storing instrument panel cover.

More specifically, but without restriction to the particular use which is shown and described, this invention relates to a self-storing, bi-folding instrument panel cover wherein sections of the cover may be nested into each other to minimize obstruction within an operator compartment when the panel cover is in a storage position.

Off-the-road vehicles, such as construction machinery equipment and earth moving equipment, are frequently used in remote locations where these vehicles are left unattended overnight and on weekends. In such remote areas these vehicles are subject to vandalism, pilferage and unauthorized use. If the vehicles are vandalized, such as by breaking the various gages or controls on the instrument panels, or if the gages and instruments are stolen, they must be fixed or replaced before the machine can be operated resulting in expensive machine down time.

Another problem frequently encountered when such vehicles are left unattended for long periods of time is the unauthorized or accidental movement of the vehicle. Such unauthorized use creates a safety problem both for the person operating the machine as well as to any persons who may be in the vicinity of the vehicle operation.

In order to alleviate the problem of vandalism, pilferage, and unauthorized operation, instrument panel covers have been developed to protect and lock the instrument panel. Such covers are designed to protect the integrity of the instrument panel when the vehicle is not in use and to prevent vehicle operation. While such panels are effective to achieve these objectives, it has been found in practice that these security panels are generally quite cumbersome in construction and cannot be conveniently stored when not in use. Since such panels are so inconvenient, they are frequently misplaced and ignored by the machine operator.

One attempt to provide a more convenient instrument panel cover is disclosed in U.S. Pat. No. 3,814,205. The instrument panel cover shown therein is hinged to the vehicle dashboard along the lowermost edge of the cover such that the cover may be folded upwardly to enclose and lock the instrument panel or be folded downwardly and locked into the stored position.

While such an instrument panel cover may be suitable for certain purposes, it has been found that the positioning of instrument panel covers in a stored position beneath the vehicle dashboard interferes with the operator's functions within the equipment cab, such an obstruction creates additional problems, and is objectionable to the machine operators.

SUMMARY OF THE INVENTION

It is, therefore, an object of this invention to improve instrument panel covers for securing the integrity of an instrument compartment.

Another object of this invention is to secure the integrity of an instrument compartment by means of an instrument panel cover which may be conveniently stored without creating an obstruction.

A further object of this invention is to secure the integrity of an instrument panel with a security cover which may be conveniently stored in minimal space when not in use.

These and other objects are attained in accordance with the present invention wherein there is provided an instrument panel cover pivotally connected to the vehicle dashboard and adapted to be folded upon itself into a position above the dashboard to minimize the storage space required by the panel cover when not in use and to eliminate obstructions in the operator compartment or the operator's field of vision.

DESCRIPTION OF THE DRAWINGS

Further objects of the invention, together with additional features contributing thereto and advantages accruing therefrom, will be apparent from the following description of a preferred embodiment of the invention which is shown in the accompanying drawings with like reference numerals indicating corresponding parts throughout, wherein:

FIG. 1 is a side elevation view of a construction machine, commonly referred to as a wheeled scraper, in which the invention is utilized;

FIG. 2 is a perspective view of a portion of the operator's cab of a construction machine showing a portion of the instrument panel secured by an instrument panel cover and another portion exposed with the instrument panel cover in a storage position;

FIG. 3 is a cross sectional view of a portion of a vehicle dashboard and instrument panel to better illustrate the instrument panel cover in a closed position; and FIG. 4 is a cross sectional view of a portion of the instrument panel as shown in FIG. 3, with the instrument panel cover folded into a storage position.

DESCRIPTION OF A PREFERRED EMBODIMENT

Referring now to FIG. 1, there is shown a construction machine or earth moving vehicle commonly referred to as a wheeled scraper. Although the instrument panel cover disclosed herein may be used with various vehicles, for convenience of illustration a preferred embodiment is illustrated with reference to its use with such a scraper. Generally, the scraper 1 includes a draft or tractor unit 5 and a drawn or trailer unit 10.

The trailer unit 10 includes a scraper bowl 11 supported at its rear end by a pair of wheels 13 and at its front end by a draft frame 15 having a pair of rearwardly extending legs 16 pivotally connected to the vertical side walls of the scraper bowl 11 by a transverse pivot axis 17. The scraper bowl 11 includes a cutting edge 12 at the front end of the bottom which excavates a predetermined amount of earth as the scraper passes through a cut or borrow site. The amount of material removed as the scraper passes is controlled by raising or lowering the cutting edge 12 carried at the front end of the scraper bowl. This positioning is effected by a pair of hydraulic jacks 14 interconnecting the draft frame 15 at the front or leading portion of the scraper bowl. The jacks 14 are expanded or contracted to determine the depth of cut of the cutting edge 12 with the material being excavated passing into the scraper bowl as the scraper is moved forwardly. An elevator or flight-type conveyor 18 is carried within the scraper bowl 11 and positioned to the rear of the cutting edge 12 to receive material as it is passed into the forward portion of the bowl and move it both rearwardly and upwardly for more even distribution.

The draft unit 5 of the scraper 1 is supported by a pair of wheels 13 and includes an operator's cab 2 having an instrument and control bearing dashboard 3, steering console 4, and various other controls conveniently located within reach of the operator for controlling the vehicle as well as to monitor or adjust various accessory or auxiliary equipment of the vehicle for effecting desired operations. The dashboard 3 includes an instrument panel 30 which is normally exposed such that the instruments, gages and controls mounted thereon may be observed by the operator to insure proper machine operation.

As best shown in FIGS. 2, 3 and 4, the dashboard 3 has a security or instrument panel cover 40 fastened thereto above the instrument panel 30. The security cover 40 may be locked in a closed position to maintain the integrity of the instrument panel by means of a latch 50 secured to the dashboard and which extends through an aperture 41 formed in the cover 40 when the cover is closed. A suitable locking device, such as a padlock 60, can be locked through an aperture 51 formed in the latch 50, to prevent the cover from being opened.

The instrument panel cover 40 is fastened to the top of the dashboard 3 by a hinge connection 42 such that the instrument panel cover 40 may be swung or pivoted upwardly about the hinged connection 42 onto the top of the dashboard 3. The instrument panel cover 40 is formed of two complementary sections 43 and 44 hingedly secured one to the other by a hinged connection 45 such that the lowermost panel 44 may be pivoted upwardly about the hinged connection 45 into engagement with the upper panel 43. Both panels may then be folded upwardly about the hinge connection 42 onto the top of the dashboard 3 as best shown in FIG. 4.

The complementary shaping of the two sections 43 and 44 allows the upper section 43 to cover a portion of the instrument panel 30 and provides a base for the hinged connection 45 which is spaced outwardly from the face of the instrument panel 30 to which the lower section 44 is joined. The spacing of the lower section 44 out from the instrument panel 30 permits the instrument panel cover 40 to extend outwardly beyond outwardly extending knobs, switches, dials or levers frequently encountered on a portion of the instrument panel 30.

Referring especially to FIG. 3, to permit the instrument panel cover 40 to suitably conform to the instrument panel 30, the upper section 43 has a first panel portion 43(1) inclined downwardly and inwardly from the hinged connection 42 with a second panel portion 43(2) joined thereto and extending parallel to the face of the instrument panel 30. A third panel portion 43(3) extends from the lower edge of the second panel portion 43(2) downwardly and outwardly with the trailing edge portion thereof forming a portion of the second hinged connection 45.

The second or lower section 44 is joined to the lowermost panel 43(3) of the upper section 43 about the hinged connection 45. The section 44 includes two panels 44(1) and 44(2). The panel 44(1) extends downwardly and inwardly from the hinged connection 45 toward the instrument panel 30 and extends a length substantially equal to that of panel 43(3) of the first section 43. The second panel 44(2) extends downwardly and inwardly from the edge of the first panel 44(1) toward the instrument panel 30 and extends a length substantially equal to that of panel 43(2). In this manner when the lower section 44 is pivoted about the hinged connection 45 into contact with the upper section 43, the face of panel 44(1) will be positioned in contact with the face of panel 43(3) and the face of panel 44(2) will engage the face of panel 43(2) to minimize the space required by the instrument panel cover 40 when in a stored position.

Panel 43(1) of the first section 43 which is coupled to form the hinged connection 42 with the dashboard 3 extends downwardly and inwardly toward the instrument panel 30 a distance corresponding to the distance between the hinge connection 42 and the top of the dashboard 3 so that upon pivoting the two sections 43 and 44 upwardly about the hinge connection 42, the instrument panel cover 40 will be positioned on top of the dashboard 3, but directly adjacent thereto such as not to interfere with the operator's line of vision.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a vehicle cab having a dashboard, an instrument panel mounted therein and a security cover for covering the instrument panel, the improvement comprising a first pivotal cover section pivotally supported adjacent to the uppermost portion of the dashboard by a horizontally extending hinge, said first pivotal cover section extending downwardly from said hinged connection and bowed inwardly toward said instrument panel in a substantially concave cross-sectional contour to form a portion of an instrument panel security cover, a second pivotal cover section pivotally supported from said first pivotal cover section by a second horizontally extending hinge, said second pivotal cover section extending downwardly from said hinged connection adjacent to the instrument panel to form a portion of the instrument panel security cover, and means for releasably securing said second pivotal cover section to the vehicle dashboard to maintain the instrument panel covered.

2. Apparatus of claim 1 wherein said first pivotal cover section comprises a first panel portion extending downwardly from said first hinge connection and inwardly toward the instrument panel from the uppermost portion of the vehicle dashboard, a second panel portion extending from the trailing edge of said first panel portion parallel to the instrument panel, and a third panel portion extending downwardly from the trailing edge of said second panel portion and downwardly and outwardly from the vehicle instrument panel to form a support for said second pivotal cover section.

3. In a vehicle cab having a dashboard, an instrument panel mounted therein and a security cover for covering the instrument panel, the improvement comprising a first pivotal cover section pivotally supported adjacent to the uppermost portion of the dashboard by a horizontally extending hinge, said first pivotal cover section extending downwardly from said hinged connection to form a portion of an instrument panel security cover, said first pivotal cover section comprising a first panel portion extending downwardly from said first hinge connection and inwardly toward the instrument panel from the uppermost portion of the vehicle dashboard, a second panel portion extending from the trailing edge of said first panel portion parallel to the instrument panel, and a third panel portion extending downwardly from the trailing edge of said second panel portion and downwardly and outwardly from the vehicle instrument panel to form a support for said second pivotal cover section, a second pivotal cover section pivotally supported from said first pivotal cover section by a second horizontally extending hinge, said second pivotal cover section extending downwardly from said hinged connection adjacent to the instrument panel to form a portion of the instrument panel security cover, said second pivotal cover section comprising a first panel portion pivotally supported from the trailing edge of said first pivotal cover section and extending downwardly and outwardly therefrom a length substantially equal to that of said third panel portion of said first pivotal cover section so that upon pivotal movement of said second cover section about said second hinge, said panel portions will nest one into the other, and a second panel portion extending from the trailing edge of said first panel portion downwardly and inwardly toward the instrument panel a length substantially equal to that of said second panel portion of said first pivotal cover section so that upon pivotal movement of said second cover section about said second hinge said panel portions will nest one into the other.

4. The apparatus of claim 3 wherein said second panel portion of said second cover section is formed with an aperture therein to facilitate releasably securing said second pivotal cover section to the dashboard.

5. The apparatus of claim 3 further including means for releasably securing said second pivotal cover section to the vehicle dashboard to maintain the instrument panel covered.

6. A security cover for enclosing an instrument panel mounted in a vehicle dashboard comprising a first covering section hingedly supported adjacent to the uppermost portion of a vehicle dashboard and extending downwardly therefrom and bowed inwardly toward said instrument panel in a substantially concave cross-sectional contour to cover and uncover a portion of an instrument panel mounted in the vehicle dashboard, a first hinge means joining said first covering section adjacent to the uppermost portion of the vehicle dashboard for pivotal movement relative thereto, a second covering section hingedly supported from the lowermost portion of said first covering section and extending downwardly therefrom to cover and uncover a portion of the instrument panel, a second hinge means joining said first covering section to said second covering section for pivotal movement of said second covering section into contact with said first covering section thereby uncovering a portion of the instrument panel, and means for releasably securing said second covering section to the vehicle dashboard for preventing pivotal movement of said second covering section into contact with said first covering section to maintain the instrument panel covered.

7. The apparatus of claim 6 wherein said first covering section comprises a first panel portion extending from said first hinge means downwardly and inwardly toward the vehicle instrument panel a distance at least as great as the distance between said first hinge means and the uppermost portion of the vehicle dashboard, a second panel portion extending from the trailing edge of said first panel portion parallel to the vehicle instrument panel, and a third panel portion extending downwardly from the trailing edge of said second panel portion and outwardly from the vehicle instrument panel to form a support for said second hinge means joining said first covering section to said second covering section.

8. A security cover for enclosing an instrument panel mounted in a vehicle dashboard comprising a first covering section hingedly supported adjacent to the uppermost portion of a vehicle dashboard and extending downwardly therefrom to cover and uncover a portion of an instrument panel mounted in the vehicle dashboard, a first hinge means joining said first covering section adjacent to the uppermost portion of the vehicle dashboard for pivotal movement relative thereto, said first covering section comprising a first panel portion extending from said first hinge means downwardly and inwardly toward the vehicle instrument panel a distance at least as great as the distance between said first hinge means and the uppermost portion of the vehicle dashboard, a second panel portion extending from the trailing edge of said first panel portion parallel to the vehicle instrument panel, and a third panel portion extending downwardly from the trailing edge of said second panel portion and outwardly from the vehicle instrument panel to form a support for a second hinge means joining said first covering section to a second covering section, a second covering section hingedly supported from the lowermost portion of said first covering section and extending downwardly therefrom to cover and uncover a portion of the instrument panel, a second hinge means joining said first covering section to said second covering section for pivotal movement of said second covering section into contact with said first covering section thereby uncovering a portion of the instrument panel, said second covering section comprising a first panel portion pivotally supported from the trailing edge of said first covering section and extending downwardly and outwardly therefrom a length substantially equal to that of said third panel portion of said first covering section so that upon pivotal movement of said second covering section about said second hinge means joining said first covering section to said second covering section said panel portions will nest one into the other, and a second panel portion extending from the trailing edge of said first panel portion downwardly and inwardly toward the vehicle instrument panel a length substantially equal to that of said second panel portion of said first covering section so that upon pivotal movement of said second covering section about said second hinge means joining said first covering section to said second covering section said panel portion will nest one into the other.

9. The apparatus of claim 8 wherein said second panel portion of said second covering section is formed with an aperture therein to facilitate releasably securing said second covering section to the vehicle dashboard.

10. The apparatus of claim 8 further including means for releasably securing said second covering section to the vehicle dashboard for preventing pivotal movement of said second covering section into contact with said first covering section to maintain the instrument panel covered.

* * * * *